United States Patent
Tsuchida

(10) Patent No.: US 7,195,183 B2
(45) Date of Patent: Mar. 27, 2007

(54) METHOD OF PROCESSING COMPOSITE WASTES

(75) Inventor: Minoru Tsuchida, Kitakyusyu (JP)

(73) Assignee: A.P.R. Co., Ltd., Fukuoka (JP)

( * ) Notice: Subject to any disclaimer, the term of this patent is extended or adjusted under 35 U.S.C. 154(b) by 29 days.

(21) Appl. No.: 10/758,529

(22) Filed: Jan. 16, 2004

(65) Prior Publication Data

US 2004/0144692 A1 Jul. 29, 2004

(30) Foreign Application Priority Data

Jan. 16, 2003 (JP) .......................... P2003-007907

(51) Int. Cl.
   B02C 23/14 (2006.01)
   B02C 11/08 (2006.01)
   B02C 23/08 (2006.01)

(52) U.S. Cl. ............... 241/17; 241/24.1; 241/24.11; 241/24.12; 241/24.13; 241/24.14; 241/24.15

(58) Field of Classification Search ............. 241/17, 241/24.1, 24.11, 24.12, 24.13, 24.14, 24.15
See application file for complete search history.

(56) References Cited

U.S. PATENT DOCUMENTS

| | | | | |
|---|---|---|---|---|
| 3,266,413 A * | 8/1966 | Sharp et al. | ................ | 100/353 |
| 4,376,373 A * | 3/1983 | Weber et al. | ................ | 60/648 |
| 5,535,685 A * | 7/1996 | Choi | .......................... | 110/223 |
| 6,086,000 A * | 7/2000 | Murata | ........................ | 241/19 |
| 6,141,945 A * | 11/2000 | Becher | ........................ | 53/527 |
| 6,336,601 B1 * | 1/2002 | Ueno et al. | ................... | 241/23 |

* cited by examiner

Primary Examiner—Lowell A. Larson
Assistant Examiner—Jason Y. Pahng
(74) Attorney, Agent, or Firm—Whitham Curtis Christofferson & Cook, PC

(57) ABSTRACT

A method or processing composite waste including combustibles and incombustibles has a press process for pressing the composite waste, a dry distillation process for performing dry distillation on the pressed composite waste, a shredding process for shredding the composite waste that has been pressed and has undergone dry distillation and a separating process for separating the shredded composite waste into combustible carbide and incombustibles.

4 Claims, 3 Drawing Sheets

METHOD OF PROCESSING COMPOSITE WASTES

BACKGROUND OF THE INVENTION

1. Field of the Invention

The present invention relates to a method of processing composite wastes including combustibles and incombustibles such as the bodies of waste cars.

2. Description of Related Art

The recycling of waste articles to effectively utilize limited natural resources has been receiving much attention lately. In some countries, shredder dust, Freon and air bags from waste cars, for example, are designated as recyclables. Of these three articles, shredder dust poses the most formidable obstacle in the recycling of waste cars. Therefore, shredder dust is collected generally by the car manufacturers. Shredder dust is a collection of small pieces of waste materials formed by shredding the body of a car together with the seats and various ornamental materials inside the car. Car manufacturers may commission appropriate contractors to perform final disposal of the shredder dust. As means of disposal, various facilities are planned, such as dry distillation furnaces, carbonization furnaces, incinerators, melting furnaces, blast furnaces, electric furnaces and final disposal dump.

Conventionally, waste cars are processed according to the method shown in FIG. 1. First, the engine, battery, tires, fuel tank, suspension are dismantled from the waste car, leaving the body and mostly ornamental materials inside the car (step S1). The remaining materials, i.e., the body and ornamental materials, are shredded (step S2). The shredded materials are separated into two groups. One is pieces of metals such as iron and aluminum. The other is shredder dust including mainly pieces of combustibles such as plastics and cloth (step S3).

However, a small amount of metal pieces (metal scraps) cannot be separated successfully from the combustibles. That is, a small amount of metal pieces remains in the shredder dust. Then, the combustibles are carbonized by subjecting the shredder dust to dry distillation (step S4).

Conventionally, before performing the dry distillation process, the shredded materials are separated into metal scraps and shredder dust. While efforts to increase the thoroughness of this separation will increase the amount of metal scraps to be collected, it will lead to increased costs for separation. Since the combustible and the incombustibles are connected to each other by cohesive materials, these materials remain connected even after they are shredded into small pieces. So it is difficult to separate them thoroughly by using a magnetic pulling force or the difference in their specific gravities and results in increased costs. Further, heat loss is large, because the shredder dust includes a lot of water. Therefore, much time has been required to distill the shredder dust and expenses are high because a drying device is needed to dry shredder dust having so much water.

SUMMARY OF THE INVENTION

In view of the foregoing, it is an object of the present invention to provide a method of processing composite waste car that separates combustibles and incombustibles almost completely, reducing the time and costs of the process.

In order to attain the above and other objects, the present invention provides a method of processing composite waste including combustibles and incombustibles. In the method, a press process is firstly performed for pressing the composite waste. A dry distillation process is performed for completion of dry distillation on the pressed composite waste.

It is preferable that a shredding process be performed for shredding the composite waste that has been pressed and has undergone dry distillation. Then, a separating process is performed for separating the shredded composite waste into combustible carbide and incombustibles.

The shredding process is divided into two steps. A first step is a coarse shredding and a second step a fine shredding. The first step is performed preceding the second step.

The composite waste is, for example, a body of a car, seats and ornamental materials inside the car. Preferably, the pressed composite waste is formed in a rectangular parallelepiped shape.

BRIEF DESCRIPTION OF THE DRAWINGS

The above and other objects, features and advantages of the invention will become more apparent from reading the following description of the preferred embodiments taken in connection with the accompanying drawings in which.

DETAILED DESCRIPTION OF THE PREFERRED EMBODIMENTS

A method of processing composite wastes according to preferred embodiments of the present invention will be described while referring to the accompanying drawings.

Figure 1:
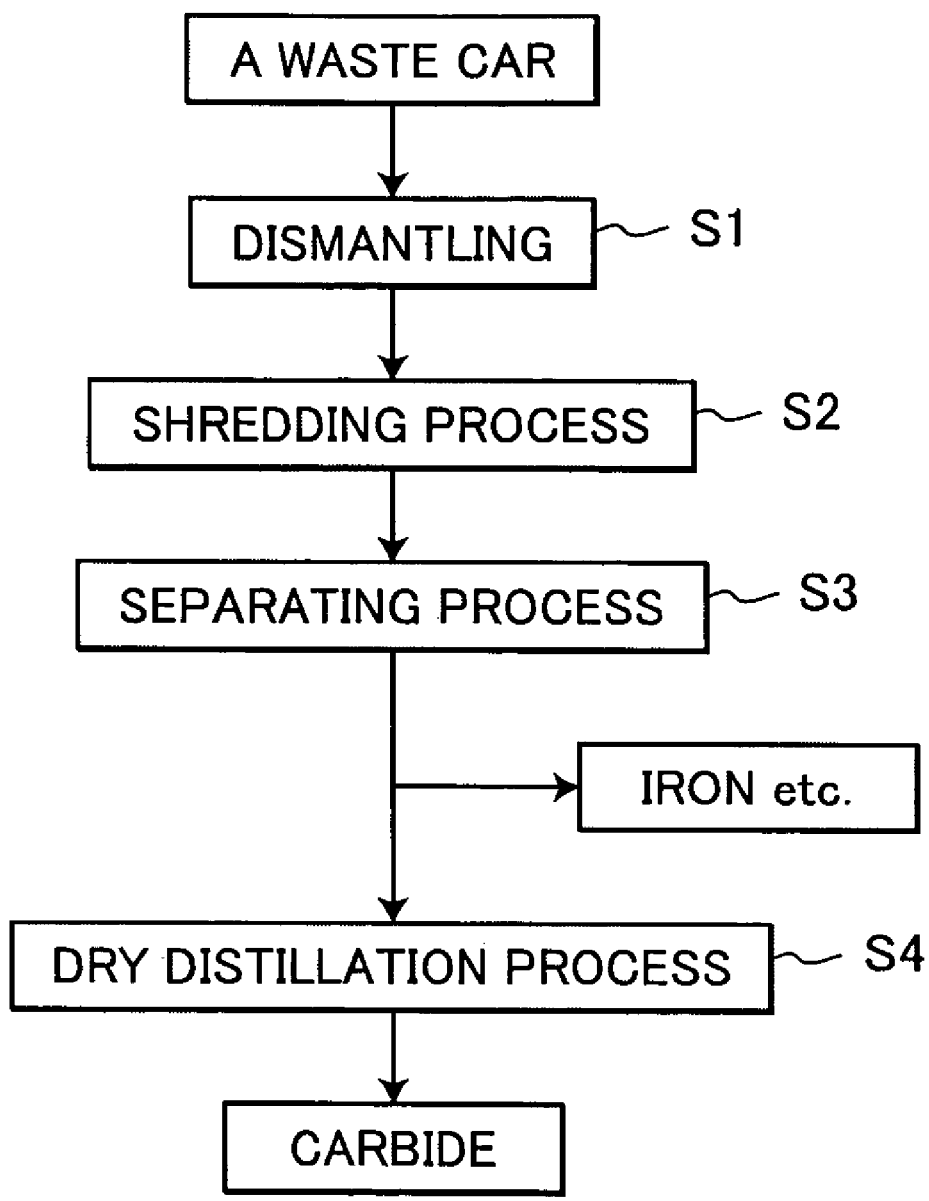
FIG. 1 is a flowchart illustrating a conventional method of processing waste cars.
Figure 2:
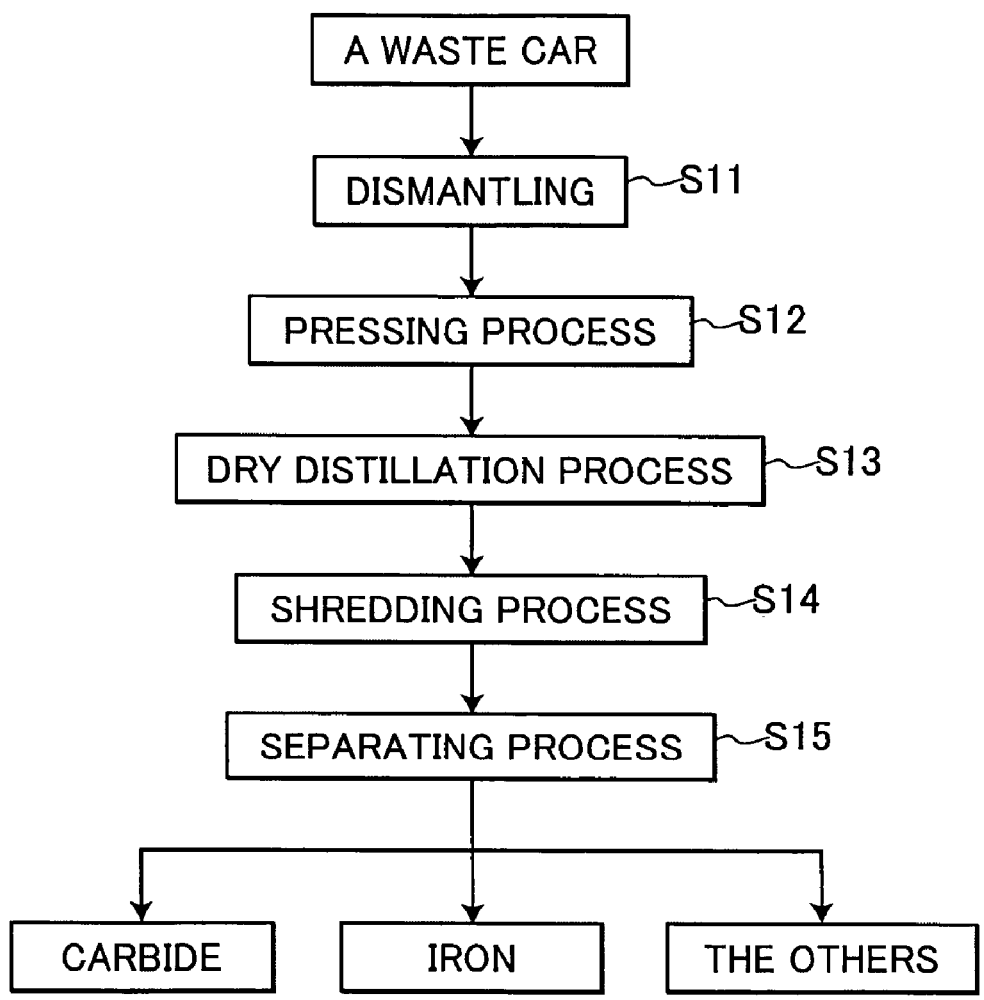
FIG. 2 is a flowchart illustrating a method of processing waste cars according to one embodiment of the invention.

FIG. 2 is a flowchart showing each process in a method of processing waste cars according to an embodiment of the present invention. Firstly, the engine, battery, tires, fuel tank and suspension are dismantled from the waste car, leaving only the body, seats, and mostly interior ornamental materials (step S11). This process is the same as step S1 in the flowchart of FIG. 1. In the case of a small waste car, the remaining part consists of the body, which weighs about 500 Kg and includes mainly iron and combustible materials. The combustible materials include the seats and interior ornamental materials that weigh about 250 Kg.

Then, a pressing process is carried out to the remaining body etc. (step S12), before carrying out the shredding process. The pressing process is carried out on the body and the like using a press machine in three directions: top-to-bottom, left-to-right, and front-to-rear. The result is a pressed block in the shape of a rectangular parallelepiped. The typical small waste car in the example described above becomes a rectangular parallelepiped block having width, thickness and length of 60 cm×60 cm×100 cm. Then, an appropriate number of pressed blocks is placed in a dry distillation pot, and the dry distillation process is performed (step S13).

Dry distillation is a process in which solid organic matter is heated and broken down while preventing exposure to air, resulting in carbide etch. Firstly, air inside the dry distillation pot is replaced by nitrogen gas supplied from outside the pot. Then, the pot is heated by a burner disposed outside the container. Dry distillation is carried out under a temperature ranging from 200 to 650° C., because sufficient dry distillation cannot be achieved at temperatures under 200° C., while explosions of fine carbon dust and melting of aluminum may occur at temperatures over 600° C.

When the dry distillation process is finished, residuals are left in the pot. The residuals are drawn from the pot and subjected to a shredding process (step S14). The shredding is preferably divided into two steps: a first step in which coarse shredding is performed and a second step in which fine shredding is performed. Iron scraps are removed from the shredded dry distillation residuals using a magnetic pulling force, while other metal scrape, such as aluminum scraps, are removed using the difference in their specific gravities (step S15).

Figure 3:
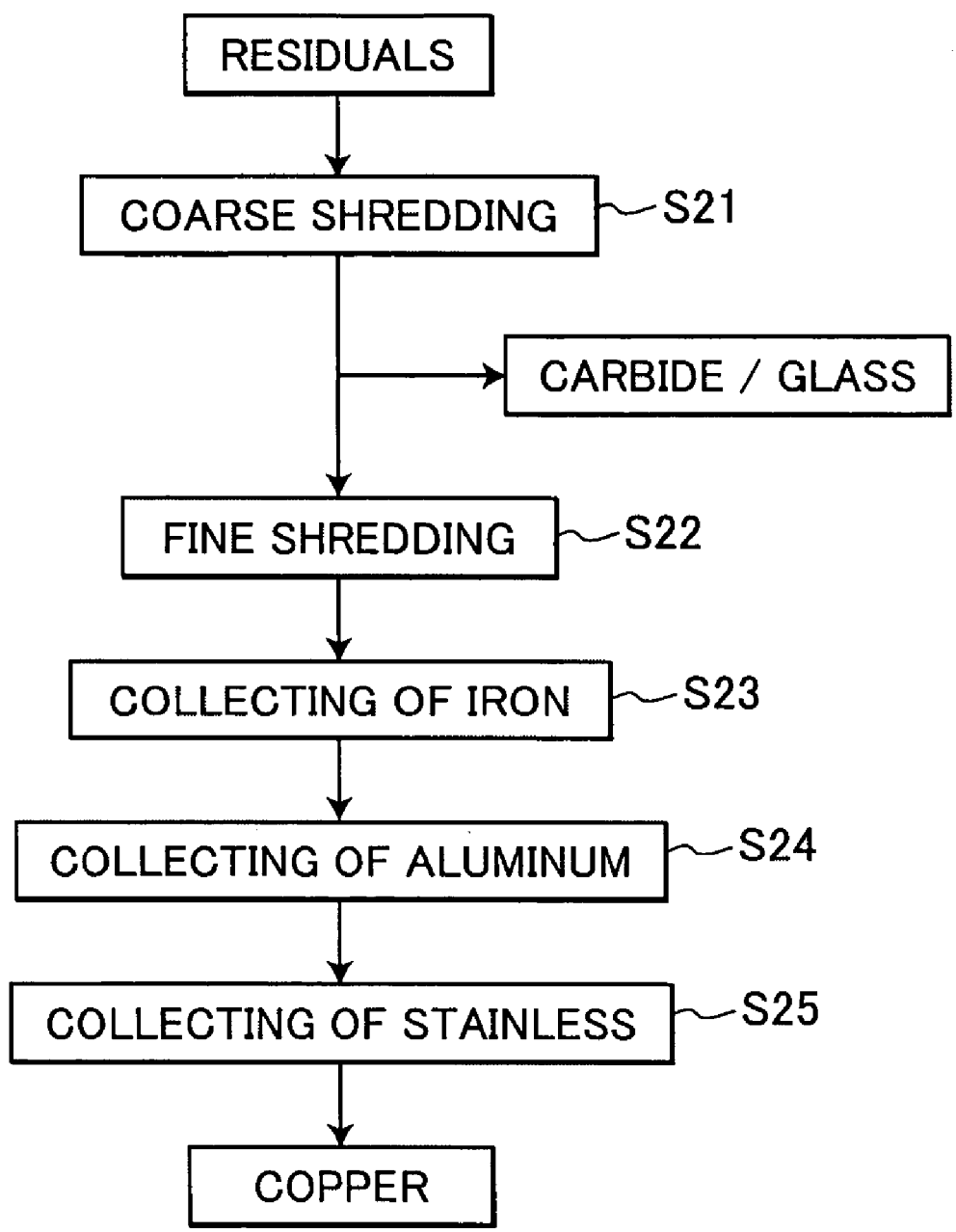
FIG. 3 is a flowchart illustrating in detail steps S14 and S15 contained in the flowchart of FIG. 2.

FIG. 3 is a flowchart showing detailed processes of steps S14 and S15 contained in the flowchart of FIG. 1. In the flowchart of FIG. 3, steps S21 and S22 correspond to the shredding process (step S14) in the flowchart of FIG. 2, and steps S23 through S25 correspond to the separating process (S15) in the flowchart of FIG. 2. In step S21, the residuals are shredded coarsely. The coarse shredding process is a process for loosening the residuals. As a result of the coarse shredding process, carbide and glass are collected from the residuals. To be more precise, when the residuals are loosened, the carbide is brought into a powdered state and released into air, which are collected by a vacuum cleaner, for example. On the other hand, when the residuals are loosened, the glass is broken into small pieces and drops on ground. Since just the coarse shredding process is performed to the residuals, the remaining materials (iron etc.) are held in an interwoven condition and do not crumble to fall on the ground.

Next, the residuals are shredded finely (step S22) and then iron is collected (stop S23) by a magnetic ore separator having magnetic flux density of 7000 gauss. Since stainless steel has a magnetic substance which does not stick to a magnet having magnetic flux density of 7000 gauss, the stainless steel remains in residuals.

Next, aluminum is collected (step S24) by an aluminum-separator. As the aluminum separator, a magnetic ore separator is adopted having a magnetic flux density of 14000 gauss. Lastly, stainless steel is collected (step S25). As a result, only copper remains in the residuals.

In the above-described embodiment, shredder dust is described as the object to be processed. However, the object of processing can be any other appropriate material, such as waste electric appliances, and waste materials left at construction sites consisting of incombustibles like motor scraps and combustibles like wooden materials.

In the present invention, separation of carbide and metals is so easy, because only carbide and metals exist in the shredded dry distillation residuals. Therefore, almost 100% of the metals can be collected. Further, metals, especially iron, are not oxidized and are maintained at a high quality, because the metals are distilled in a reduction process. A small high-density pressed block of a rectangular parallelepiped shape can be obtained by pressing the body of the waste car. The size of the pressed block described above is a typical example. In general, carbonization proceeds from the peripheral portion of the material in the dry distillation process, because the peripheral portion is either in contact with or near a hot wall of the pot. Once the peripheral portion is carbonized, heat conductivity of this portion becomes low. As a result, it is difficult to prolong the process enough to carbonize the inside of the materials, as heat transmission from the peripheral portion to the inner portion decreases more and more. However, according to the present invention, pressed blocks have high density and, thus, conduct heat well. AS a result, the heat can be transmitted rapidly from their peripheral portion to their inner portion, reducing the time required to achieve carbonization throughout the pressed blocks. One reason that heat conductivity increases in the pressed blocks is the increased density inside the pressed blocks, as was already described above. Another reason is that the pressed blocks contain a large amount of metal scraps, which are very good heat conductors, and that the heat conductivity is homogeneous thanks to the rectangular parallelepiped shape.

As has been described above, according to the present invention, the time required for the dry distillation process (carbonization process) can be largely reduced. Conventionally, a dry distillation process required as long as 12–24 hours. It is confirmed that the process time is reduced to ½–¼ in the present invention. The high heat conductivity aspect of the pressed blocks not only reduces the process time for dry distillation, but also reduces the time required to wait for the carbonized blocks to cool. As a result, the overall process time is further reduced.

Conventionally, a double pot was used. The double pot includes an inner pot and an outer pot wherein the former is detachably mounted inside the latter. Distillation is performed while putting the residuals into the inner pot, and the inner pot is detached from the outer pot for cooling. With the present invention, no such troublesome handing is required because the carbonized blocks are easily cooled. Further, heating efficiency is better than when using the double pot. Furthermore, the present invention is advantageous in that the low heating temperature can be maintained during the distillation longer than the case in which the double pot is used, resulting in a low power consumption Further, as the pressed blocks become small as a result of the pressing process, they can be contained in a dry distillation pot at a high density. To utilize this advantage, it will be preferable to use a distillation pot having a flat bottom. Due to their small rectangular parallelepiped shape and high density, the pressed blocks can save space allocated when they are waiting for the next dry distillation process and can be conveyed easily. In addition, presentation of the working apace is less unsightly than when processing shredder dust of disorderly shapes.

Conventionally, shredder dust is put in the dry distillation pot, an appropriate amount of shredder dust is used in each process, taken from a pile of shredder dust that is formed from a plurality of waste cars. Accordingly, the ratio of combustibles to be carbonized to incombustibles fluctuates in each dry distillation process. Therefore, the time required to complete the dry distillation process fluctuates in each process, making it difficult to manage the process time. If the process time is fixed, an uncarbonized portion will remain inside the pressed blocks. From this point of view, the ratio of combustibles to incombustibles in a pressed body is almost the same, especially for the same style of waste cars. As a result, the ratio is almost constant when an appropriate number of pressed blocks is used in the dry distillation process. Accordingly, the process time of dry distillation becomes almost constant and complete carbonization will be achieved throughout nearly the entire portion of each block.

Carbide, which is combustible, is used as a reducing agent of iron etc. in electric furnaces and blast furnaces. Carbide that includes uncarbonized combustibles can generate acid gas. The generation of acid gas can make it difficult for the carbide to reduce iron etc., requiring facilities to discharge the acid gas. On the other hand, if the combustible is carbonized completely, the only generated gas is carbon dioxide, which is a reducing medium. As a result, the efficiency of the process to reduce iron etc. is improved. Therefore, the carbonized blocks can be sold as a reducing medium to contractors who deal with electric furnaces and blast furnaces, without being shredded after dry distillation. It is not preferable to include copper in carbide for electric furnaces and blast furnaces. Therefore, if the waste cars have harnesses including copper, the whole carbonized blocks can be sold to contractors who deal with electric furnaces and blast furnaces by pressing the waste cars after removing the harnesses including copper.

The working space becomes sordid because large amounts of particles are generated when the shredder shreds the waste cars before dry distillation. Water is distributed to prevent the large amounts of particles from flying in all directions. The shredder dust becomes wet from the distributed water. Therefore, heating efficiency drops because the shredder dust is placed in the dry distillation pot while still wet. Further, if the shredder dust is allowed to dry before being placed in the dry distillation pot, a longer time is required to complete the processing. According to the present invention, distributing water is not necessary because shredding is not carried out before dry distillation. Therefore, the problems caused by wet shredder dust are not generated.

Conventionally, glass and soil are contained in the shredder dust when the waste cars are shredded before dry distillation. Therefore, removing the glass and soil takes time and labor. According to the present invention, the waste cars which were pressed and distilled can be sold to contractors who deal with electric furnaces and blast furnaces without shredding the shredded blocks. In such a case, the process to remove the glass and soils becomes unnecessary.

While the invention has been described in detail with reference to the specific embodiment thereof, it would be apparent to those skilled in the art that various changes and modifications may be made therein without departing from the spirit of the invention.

What is claimed is:

1. A method of processing a waste car body including combustibles and incombustibles, comprising:
   dismantling engine, battery, tires, fuel tank and suspension from the waste car body;
   pressing said car body in three directions: top-to-bottom, left-to-right, and front-to-rear, forming a rectangular parallelepiped block;
   performing a dry distillation process-of said rectangular parallelepiped block in which solid organic matter is broken down resulting in residuals;
   performing a coarse shredding of said residuals in order to separate glass and carbide produced by said dry distillation step;
   performing a fine shredding of said residuals from which glass and carbide have been separated; and
   separating metals from fine shredded pieces of said residuals.

2. The method of processing a waste car body recited in claim 1, wherein the separated metals include iron, aluminum, stainless steel and copper.

3. The method of processing a waste car body recited in claim 1, wherein the dry distillation process is carried out in a non-reducing atmosphere under a temperature ranging from 200–650% degrees C.

4. The method of processing a waste car body recited in claim 1, wherein multiple rectangular parallelepiped blocks are simultaneously subject to said dry distillation process in a common distillation pot.

* * * * *